United States Patent [19]

Pennisi

[11] Patent Number: 5,654,861
[45] Date of Patent: Aug. 5, 1997

[54] THERMAL PROTECTION CIRCUIT

[75] Inventor: Alessio Pennisi, Milan, Italy

[73] Assignee: SGS-Thomson Microelectronics S.r.l., Agrate Brianza, Italy

[21] Appl. No.: 639,345

[22] Filed: Apr. 26, 1996

Related U.S. Application Data

[63] Continuation of Ser. No. 218,599, Mar. 25, 1994, abandoned.

[30] Foreign Application Priority Data

Mar. 31, 1993 [EP]  European Pat. Off. .............. 93830129

[51] Int. Cl.$^6$ ........................................ H02H 5/04
[52] U.S. Cl. .............................. 361/103; 361/88
[58] Field of Search .................. 361/91, 103, 101, 361/88, 90

[56] References Cited

U.S. PATENT DOCUMENTS 5,099,381  3/1992  Wilcox ..................... 361/103

FOREIGN PATENT DOCUMENTS 0511561  11/1992  European Pat. Off. .......... H02H 5/04

*Primary Examiner*—Jeffrey A. Gaffin
*Assistant Examiner*—Sally C. Medley
*Attorney, Agent, or Firm*—David V. Carlson; Michael J. Donohue; Seed and Berry LLP

[57]  ABSTRACT

A bandgap type, thermal protection circuit for an integrated circuit does not require the use of a comparator and a voltage divider of the bandgap voltage. By contrast, the simplified thermal protection circuit of the invention utilizes a first transistor for mirroring the current flowing through the bandgap circuit through a second transistor that is functionally connected between the output node and ground. The control terminal of the second transistor is connected to a temperature dependent voltage derived from the bandgap circuit. The crossing point between the characteristic of such a temperature dependent voltage and of the VBE characteristic of the second transistor versus temperature determine the required transition on the output node.

18 Claims, 3 Drawing Sheets

THERMAL PROTECTION CIRCUIT

CROSS-REFERENCE TO RELATED APPLICATION

This application is a continuation of U.S. patent application No. 08/218,599, filed Mar. 25, 1994, now abandoned.

BACKGROUND OF THE INVENTION

In integrated circuits (ICs), especially in power ICs, power dissipation may cause the device to reach relatively high temperatures. In order to avoid degradations phenomena or even worse destructive failures of ICs, because of excessive temperature, it is often necessary to integrate a dedicated protection circuit capable of "switching-off" at least a power output portion of the integrated circuit wherein primarily power dissipation occurs, whenever a condition of risk is reached. Basically, such a thermal protection circuit must have a precise triggering threshold, in terms of temperature reached by the integrated circuit, and a relatively small area requirement, for obvious economic reasons.

Very many forms of thermal protection circuits are known in the art. Basically the desired function of the circuit is achieved by integrating a component (typically a diode) having a known temperature characteristic and using it as a temperature sensor. By comparing the temperature dependent voltage across the "sensor" with a reference voltage that is stable in temperature, a desired temperature triggering threshold can be implemented. Almost exclusively, a temperature stable, reference voltage is derived from a circuit which is commonly known as "BANDGAP" circuit. In practice, a fraction of the so-called bandgap voltage of the semiconductor is used as a stable reference in terms of temperature.

A thermal protection circuit, made according to a known approach is depicted in FIG. 1. When the voltage ($V^-$) applied to a first input of the comparator C1 equals the voltage ($V^+$) applied to the other input of the comparator C1, a desired transition of the signal present on an output node (OUT) occurs. The triggering temperature T may be determined as follows:

$$V^- = V_{BG} \frac{R_8}{R_8 + R_7} =$$

$$\left[ V_{BE} + 2 \frac{(R_3 + R_2)}{R_1} \frac{KT \ln(10)}{q} \right] \frac{R_8}{R_8 + R_7}$$

$$V_{BE} = \frac{KT}{q} \ln\left(\frac{I_C}{I_S}\right) = \frac{KT}{q} \ln\left[\frac{KT \ln(10)}{q I_S R_1}\right]$$

$$V^- = \left\{ \frac{KT}{q} \ln\left[\frac{KT \ln(10)}{q I_S R_1}\right] + \right.$$

$$\left. 2 \frac{(R_3 + R_2)}{R_1} \frac{KT \ln(10)}{q} \right\} \frac{R_8}{R_8 + R_7}$$

$$V^+ = V_{BE} = \frac{KT}{q} \ln\left[\frac{KT \ln(10)}{q I_S R_1}\right]$$

$$\left\{ \frac{KT}{q} \ln\left[\frac{KT \ln(10)}{q I_S R_1}\right] + 2 \frac{(R_3 + R_2)}{R_1} \frac{KT \ln(10)}{q} \right\} \frac{R_8}{R_8 + R_7} =$$

$$\frac{KT}{q} \ln\left[\frac{KT \ln(10)}{q I_S R_1}\right]$$

where $V_{BE}$ is the base-emitter voltage of transistor $Q_2$, $I_c$ represents the current given by the difference between the base-emitter voltages of transistors $Q_1$ and $Q_2$ divided by the resistance of $R_1$, and the term $I_s$ represents the saturation reverse current of the transistors.

By simplifying and resolving for T:

$$T = \frac{q I_S R_1}{K \ln(10)} \exp\left[ 2 \frac{(R_3 + R_2)}{R_1} \ln(10) \frac{R_8}{R_7} \right]$$

The circuit at the left of the dash line in FIG. 1 is a so-called bandgap circuit. The temperature independent voltage that is produced on the so-identified "BANDGAP" node, is divided by a precision voltage divider $R_7/R_8$ and compared with the voltage present across the diode Q344. A current substantially identical to the current flowing through the bandgap circuit is forced through the diode $Q_{344}$ by the transistor $Q_9$. At room temperature, the voltage on the inverting input (−) of the comparator C1 is lower than the voltage on the noninverting input (+). With an increase of the temperature, the voltage across the diode $Q_{344}$ decreases with a known law. Therefore, at a certain temperature, the voltage across the diode $Q_{344}$ will become lower than the voltage that is applied to the inverting input (−), thus making the comparator C1 change state.

As may be observed from the circuit analysis shown above, the precision of the triggering temperature is directly tied to the value of the resistance $R_1$, which determines the current through the diode $Q_{344}$, and to the current $I_s$, which determines the $V_{BE}$ of the diode.

Another known circuit is shown in FIG. 2. The triggering temperature T may be derived as follows:

$$V^- = V_{BG} \frac{R_8}{R_8 + R_7} =$$

$$\left[ V_{BE} + 2 \frac{(R_3 + R_2)}{R_1} \frac{KT \ln(10)}{q} \right] \frac{R_8}{R_8 + R_7}$$

$$V_{BE} = \frac{KT}{q} \ln\left(\frac{I_C}{I_S}\right) = \frac{KT}{q} \ln\left[\frac{KT \ln(10)}{q I_S R_1}\right]$$

$$V^- = \left\{ \frac{KT}{q} \ln\left[\frac{KT \ln(10)}{q I_S R_1}\right] + \right.$$

$$\left. 2 \frac{(R_3 + R_2)}{R_1} \frac{KT \ln(10)}{q} \right\} \frac{R_8}{R_8 + R_7}$$

$$V^+ = V_{BE} = \frac{2 KT R_3 \ln(10)}{q R_1}$$

$$\left\{ \frac{KT}{q} \ln\left[\frac{KT \ln(10)}{q I_S R_1}\right] + 2 \frac{(R_3 + R_2)}{R_1} \frac{KT \ln(10)}{q} \right\} \frac{R_8}{R_8 + R_7} =$$

$$\frac{KT R_3 \ln(10)}{q R_1}$$

where $V_{BE}$ is the base-emitter voltage of transistor $Q_2$, $I_c$ represents the current given by the difference between the base-emitter voltages of transistors $Q_1$ and $Q_2$ divided by the resistance of $R_1$, and the term $I_s$ represents the saturation reverse current of the transistors.

By simplifying and resolving for T:

$$T = \frac{q I_S R_1}{K \ln(10)} \left\{ \exp\left[ \frac{2 \ln(10) R_3}{R_1 R_8 (R_8 + R_7)} \right] - 2 \ln 10 \frac{(R_3 + R_2)}{R_1} \right\}$$

Differently from the circuit of FIG. 1, in this other circuit, a fraction of the bandgap voltage is compared with a voltage that is proportional to the difference between the $V_{BE}$ of a first transistor $Q_3$ and of a second transistor $Q_4$ of the bandgap circuit. This voltage difference increases with temperature while the bandgap voltage remains stable. Therefore, at the temperature indicated by the second equation of the analysis shown above, the comparator C1 will change state.

Also in this case, the precision of the triggering temperature is tied directly to the value of R1 and to the level of the current $I_s$.

As may be observed, the known circuits comprise a precise voltage divider ($R_7/R_8$) for dividing the bandgap voltage produced by the homonymous circuit, through which a temperature-stable reference voltage is derived. Moreover, the known circuits employ a comparator (C1) to the inputs of which the temperature independent reference voltage derived from the bandgap circuit and a temperature dependent voltage are applied.

SUMMARY OF THE INVENTION

It has now been found that a thermal protection circuit which, though being based itself on a bandgap circuit, does not require the use of either a comparator or of a voltage divider for the bandgap voltage produced by the homonymous circuit. The circuit of the present invention permits a great simplification and a substantial saving in terms of the occupied area. Moreover, the circuit of the invention ensures equal or better performance than that of the definitely more complex circuits of the prior art.

Essentially, in a thermal protection circuit of the invention, a current replica of the current that flows through a bandgap circuit is mirrored on a transistor that is functionally connected between the output node of the circuit and a ground node and which has a control terminal that is connected to a temperature dependent voltage of a value insufficient at room temperature, to reach a threshold voltage of the transistor. When the characteristic of the temperature dependent voltage that is applied to the control terminal of the transistor and the characteristic of the inversely, temperature-dependent threshold voltage of the transistor cross, a condition for the transistor to enter a state of conduction occurs. When the transistor starts conducting the voltage on the output node of the circuit drops to ground potential.

BRIEF DESCRIPTION OF THE DRAWINGS

The invention will be described by referring to the attached drawings, which show an important embodiment that is herein incorporated by express reference.

DETAILED DESCRIPTION OF THE INVENTION

Figure 1:
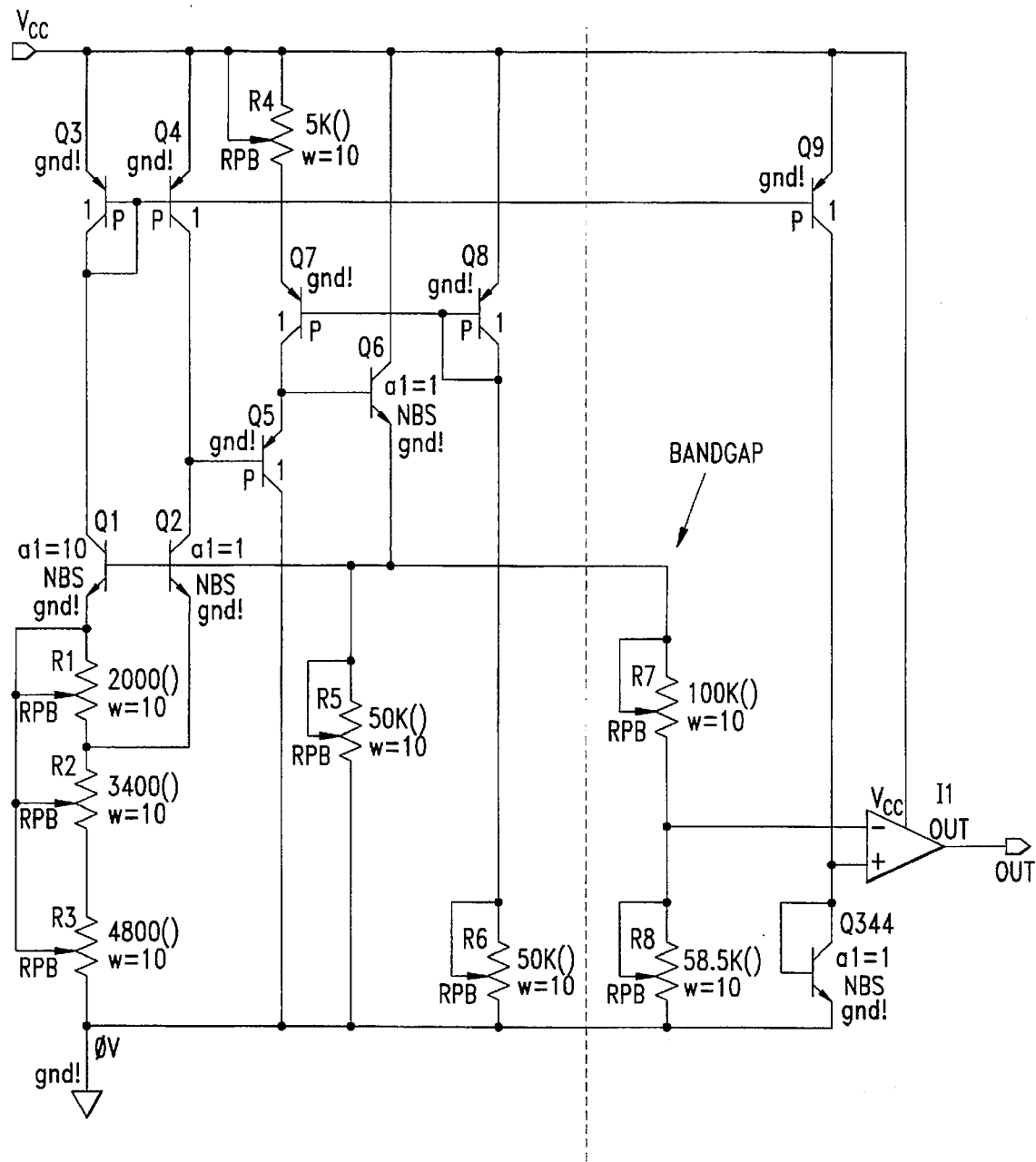
FIG. 1, shows a bandgap type, thermal protection circuit made according to a known approach, as already described above.
Figure 2:
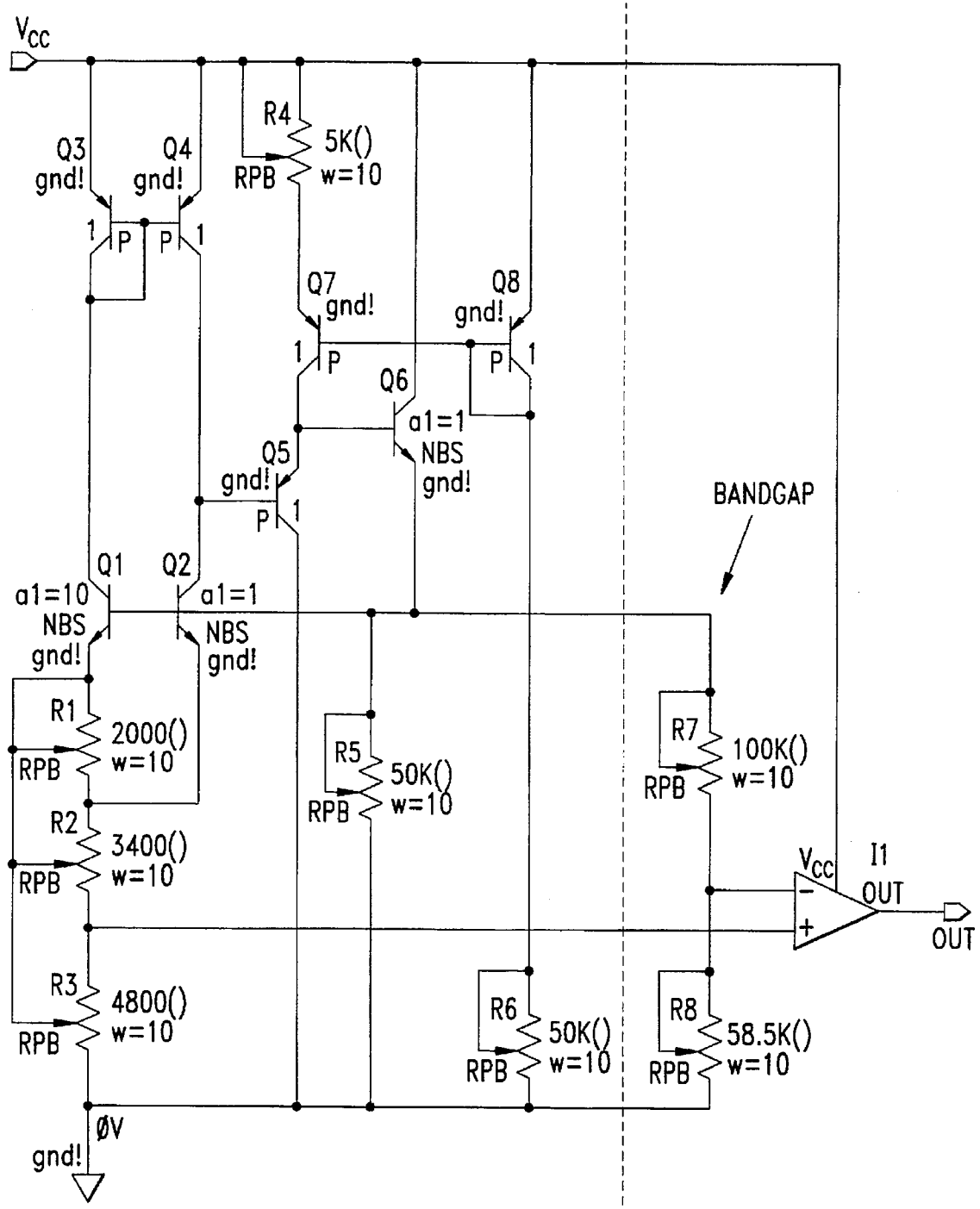
FIG. 2 shows another known bandgap type, thermal protection circuit, as already described above.
Figure 3:
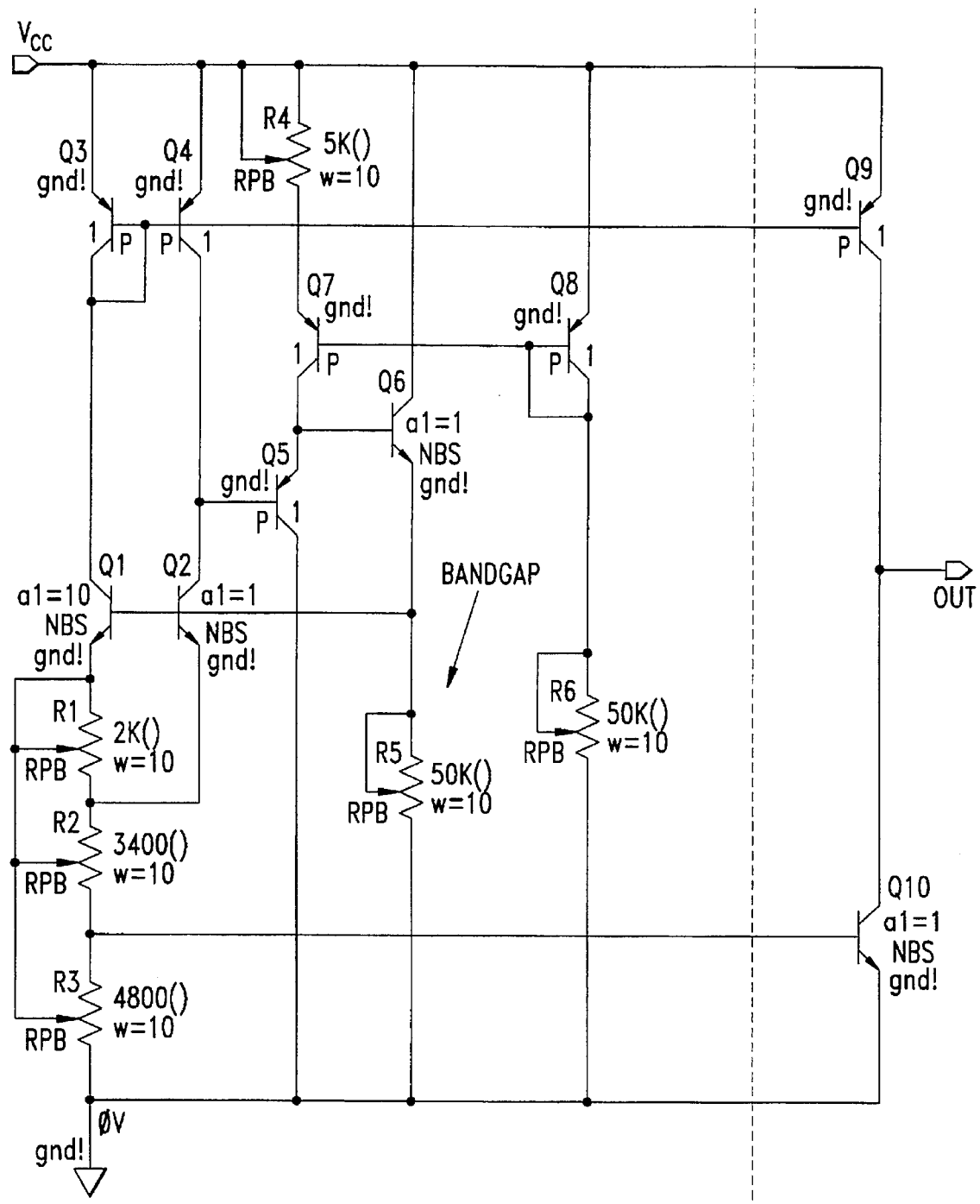
FIG. 3 shows a bandgap type thermal protection circuit made according to the present invention.

As may be observed from the circuit diagram of FIG. 3, the thermal protection circuit of the invention does not employ a comparator, as commonly employed in the prior art circuits (C1 of FIGS. 1 and 2). Moreover, the circuit does not employ a resistive voltage divider, as commonly employed in the prior art circuits, for dividing the bandgap voltage produced by the homonymous circuit, which, also in the circuit of the present invention, is depicted on the left hand side of the vertical dash line of FIG. 3. Qualitatively, the circuit of the invention functions in the following manner. The bandgap circuit produces by definition a collector current in the transistors $Q_1$, $Q_2$, $Q_3$ and $Q_4$, which is given by the known relation $(V_{BE2}-V_{BE1})/R_1$ and which is equal to: $V_T \ln(10)/R_1$ where $V_T$ is the so-called "thermal voltage" and is given by KT/q.

By the use of transistor $Q_9$, this current that flows through the bandgap circuit is mirrored and forced through the transistor $Q_{10}$ when transistor $Q_{10}$ is in a conducting state. Thus, the transistor $Q_9$ forms a current generator circuit that mirrors the current through the bandgap circuit.

This transistor $Q_{10}$, is functionally connected between the output node (OUT) of the circuit and a common (ground) node of the circuit and has a control terminal (the base of the transistor in the example shown) connected to an intermediate node of a "voltage divider" that is formed by the resistances $R_1$ and $R_2$ and $R_3$ of the bandgap circuit itself.

The base-emitter voltage of the transistor $Q_{10}$ is not sufficiently high at room temperature for permitting conduction through the transistor that remains in an OFF state and therefore does not allow the passage of the collector current of the transistor $Q_9$.

Along with an increase of the temperature, the base-emitter voltage of the transistor $Q_{10}$ increases (being proportional to: $V_T \ln(10)$), while the threshold voltage of the transistor $Q_{10}$ decreases.

When these two characteristics, both dependent on the temperature but in an opposite way, cross each other, the transistor $Q_{10}$ passes from the OFF state to an ON state (i.e., the conducting state) and therefore the voltage present on the output node OUT of the circuit goes from a high level (VCC) to a zero value (GND).

The triggering temperature may be determined as follows:

$$V_{BE} = \frac{KT}{q} \ln\left(\frac{Ic}{Is}\right) = \frac{KT}{q} \ln\left[\frac{KT\ln(10)}{qIsR_1}\right] = \frac{2KTR_3\ln(10)}{qR_1}$$

by simplifying and resolving for T:

$$T = \frac{qIsR_1}{K\ln(10)} \exp\left[\frac{2\ln(10)R_3}{R_1}\right]$$

Performance, in terms of precision of the triggering voltage, of the circuit, has been studied by purposely varying the values of the resistances in a range comprised between +30% and -30% of a respective design value and, in order to simulate a variability of the value of the $V_{BE}$ of the transistors, the areas of the transistors have been doubled and halved in respect to a design value. All the nine circuits that have been tested, each corresponding to a specific combination of said modifications of the resistance and area values, have confirmed a substantial stability of the triggering temperature, notwithstanding a large variation of said fabrication parameters. The triggering temperature remained within a range of variation of ±15° C. about the design value.

The absence of a specific voltage divider for the bandgap voltage reduces the incidence of deviation from design partition values in fabricating the integrated circuits.

The remarkable simplification of the circuit of the invention as compared with known circuits is evident by comparing the figures. It is evident the saving of silicon area that may be achieved by employing two transistors ($Q_9$ and $Q_{10}$) in place of a comparator (C1) and of a precision voltage divider ($R_7/R_8$), as commonly employed in the circuits of the prior art.

It is to be understood that even though various embodiments and advantages of the present invention have been set forth in the foregoing description, the above disclosure is illustrative only, and changes may be made in detail, yet remain within the broad principles of the invention.

Therefore, the present invention is to be limited only by the appended claims.

I claim:

1. A thermal protection circuit, comprising:
    a voltage reference circuit generating a temperature stable reference voltage, said voltage reference circuit generating a first current flowing therethrough;
    a current generator circuit coupled to said voltage reference circuit and generating a second current having a value substantially equal to said first current; and
    a first transistor receiving said second current and activated by an activation signal generated by said voltage reference circuit, said activation signal having a value insufficient, at room temperature, to activate said first transistor and having a value sufficient, at a predetermined temperature, to activate said first transistor, said first transistor producing an output signal having a first voltage level when not activated and a second voltage level when activated, said predetermined temperature being determined by the selection of component values within the thermal protection circuit.

2. The circuit of claim 1 wherein said voltage reference circuit comprises a band gap voltage circuit.

3. The circuit of claim 1 wherein said predetermined temperature is determined by the value of at least a first integrated resistance.

4. The circuit of claim 3 wherein said predetermined temperature is determined by a transistor threshold voltage of said first transistor.

5. The circuit of claim 4 wherein said transistor threshold voltage is inversely proportional to temperature.

6. The circuit of claim 3 wherein said predetermined temperature is determined by a temperature dependent control voltage applied to a control terminal of said first transistor.

7. The circuit of claim 6 wherein said temperature dependent control voltage is directly proportional to temperature.

8. The circuit of claim 3 wherein said predetermined temperature is determined by a temperature dependent control voltage applied to a control terminal of said first transistor and a transistor threshold voltage of said first transistor, said temperature dependent control voltage being directly proportional to temperature and said transistor threshold voltage being inversely proportional to temperature.

9. The circuit of claim 3 wherein said predetermined temperature is dependent on at least a first integrated resistance in said voltage reference circuit.

10. The circuit of claim 3 wherein said current generator circuit includes a second transistor coupled to a supply voltage and said first transistor.

11. A thermal protection circuit, comprising:
    a voltage reference circuit having a first current flowing therethrough and generating a temperature stable reference voltage, said voltage reference circuit also generating a temperature dependent voltage, having a positive temperature coefficient, at a first node;
    a current generator circuit generating a second current having a value substantially equal to said first current; and
    a semiconductor switching element receiving said second current and activated by said temperature dependent voltage generated by said voltage reference circuit, said semiconductor switching element including a control terminal coupled to said first node and having an intrinsic threshold activation level with a negative temperature coefficient, said semiconductor switching element being activated at a predetermined temperature when said temperature dependent voltage exceeds said intrinsic threshold activation level.

12. The circuit of claim 11 wherein said predetermined temperature is determined by the selection of component values within the thermal protection circuit.

13. The circuit of claim 11 wherein said predetermined temperature is dependent on at least a first integrated resistance in said voltage reference circuit.

14. A method for providing thermal protection in an integrated circuit, comprising the steps of:
    generating a temperature stable reference voltage in a bandgap circuit having a first current flowing therethrough;
    generating a temperature dependent control signal in said bandgap circuit, said temperature dependent control signal having a positive temperature coefficient;
    generating a second current having a value substantially equal to said first current; and
    generating a temperature dependent output signal by controlling a semiconductor switching element, said switching element receiving said second current and having a temperature dependent control element with an activation threshold having a negative temperature coefficient and configured to receive said temperature dependent control signal wherein said temperature dependent control signal is less than said activation threshold at room temperature and is greater than said activation threshold at a predetermined temperature.

15. The method of claim 14, further including the step of selecting said predetermined temperature.

16. The method of claim 15 wherein said predetermined temperature is based on the values of at least a first integrated resistance used in said step of generating a temperature stable reference voltage.

17. A thermal protection circuit capable of determining a transition of a signal produced on an output node of the circuit upon a temperature of the circuit rising above a threshold temperature, the thermal protection circuit comprising:
    a bandgap circuit containing a voltage divider circuit and generating a temperature stable voltage, said voltage divider having an associated current flowing therethrough and having an intermediate node on which a temperature dependent voltage is present, said temperature dependent voltage increasing in response to an increase in the temperature of the circuit;
    a first transistor functionally connected between the output node of the thermal protection circuit and a ground node and having a control terminal coupled to said voltage divider circuit, said first transistor having an activation threshold voltage that decreases in response to said increase in the temperature of the circuit; and
    means for mirroring said current flowing through said bandgap circuit through said first transistor wherein said first transistor is activated when said temperature dependent voltage increases in response to said increase in the temperature of the circuit and exceeds said activation threshold voltage that decreases in response to said increase in the temperature of the circuit, thus causing a transition to ground potential of the output node.

18. A thermal protection circuit as defined in claim 17 wherein said bandgap circuit comprises a plurality of bandgap circuit transistors forming a current mirror and said means for mirroring said current comprises a second transistor driven by the same voltage driving the plurality of bandgap transistors forming said current mirror of said bandgap circuit, said second transistor being functionally connected between a supply node of the circuit and the output node.

* * * * *